(12) United States Patent
Kuo

(10) Patent No.: US 10,203,471 B2
(45) Date of Patent: Feb. 12, 2019

(54) LENS DRIVING MODULE

(71) Applicant: TDK TAIWAN CORP., Yangmei Taoyuan (TW)

(72) Inventor: ChenChi Kuo, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 15/291,499

(22) Filed: Oct. 12, 2016

(65) Prior Publication Data

US 2017/0146770 A1    May 25, 2017

(30) Foreign Application Priority Data

Nov. 20, 2015  (TW) .............................. 104138409 A

(51) Int. Cl.
*G02B 15/14* (2006.01)
*G02B 7/02* (2006.01)
*G02B 7/09* (2006.01)
*G02B 7/10* (2006.01)

(52) U.S. Cl.
CPC .............. *G02B 7/09* (2013.01); *G02B 7/026* (2013.01); *G02B 7/10* (2013.01)

(58) Field of Classification Search
CPC ...... G02B 7/102; G02B 25/002; G02B 7/021; G02B 7/023; G02B 7/04
USPC ................. 359/697–698, 694, 808, 811–830
See application file for complete search history.

(56) References Cited

U.S. PATENT DOCUMENTS

| 2011/0058268 | A1* | 3/2011 | Kokichi | ................... G02B 7/08 |
| | | | | 359/824 |
| 2012/0218650 | A1 | 8/2012 | Hu et al. | |
| 2014/0049847 | A1* | 2/2014 | Hsu | ................... H02K 41/0356 |
| | | | | 359/823 |

FOREIGN PATENT DOCUMENTS

| JP | 2012-253820 A | 12/2012 |
| JP | 2013-092579 A | 5/2013 |
| TW | 201539947 A | 10/2015 |

OTHER PUBLICATIONS

Office Action from the corresponding TW Application No. 104138409 dated Oct. 2, 2016, 4 pages.

* cited by examiner

*Primary Examiner* — Dawayne A Pinkney
(74) *Attorney, Agent, or Firm* — Muncy, Geissler, Olds & Lowe, P.C.

(57) ABSTRACT

A lens driving module is provided which includes a base and an electrical terminal to electrically connect to an external circuit. The electrical terminal includes a first segment, a second segment, and a middle segment positioned between the first segment and the second segment. The electrical terminal is inserted into the base, and the first segment and the second segment are exposed to the exterior via a light emitting side surface, and the middle segment is exposed to the exterior via a light receiving side surface.

12 Claims, 7 Drawing Sheets

LENS DRIVING MODULE

CROSS REFERENCE TO RELATED APPLICATIONS

This Application claims priority of Taiwan Patent Application No. 104138409, filed on Nov. 20, 2015, the entirety of which is incorporated by reference herein.

BACKGROUND OF THE DISCLOSURE

Field of the Invention

The present invention relates to a driving module and a lens device using the same, and more particularly to a lens driving module which converts electrical energy into mechanical energy and a lens device using the same.

Description of the Related Art

Generally, a driving module is equipped to some of electronic devices to drive an element to move a predetermined distance. For example, an electronic device having an image-capturing function usually includes a driving module to generate driving power. One or more optical lens units of the electronic device are driven by the driving power to move along an optical axis, so as to facilitate auto-focus and auto-zoom controls.

However, since the driving module includes a complex driving member, such as stepper motor, ultrasonic motor, piezoelectric actuators, etc. to generate the driving power and the driving power has to be transmitted by a number of transmission elements, it is not easy to assemble and the manufacturing cost is high. In addition, a conventional driving module is also large in size and has a high power consumption due to its complex construction.

Therefore, a driving module that has the advantages of small size and simple construction is desired by the manufacturers.

BRIEF SUMMARY OF THE DISCLOSURE

Accordingly, one objective of the present invention is to provide a lens driving module, which is configured to provide a driving force to drive an element such as a lens module positioned in the lens driving module to move.

According to some embodiments of the disclosure, the lens driving module includes a lens; a lens holder configured to support the lens; a base having a light incident side surface and a light emitting side surface; a driving assembly configured to drive the movement of the lens holder relative to the base; and an electrical terminal electrically connected to an outer circuit and the driving assembly, wherein a portion of the electrical terminal is buried in the base. The electrical terminal includes a first segment, a second segment, and a middle segment. The middle segment is connected between the first and second segment and exposed by the light incident side surface. The first segment is exposed by the light emitting side surface. The second segment is exposed by the light emitting side surface.

In some embodiments, the second segment has a lower abutting surface exposed by the light emitting side surface and flush with the light emitting side surface.

In some embodiments, the middle segment has an upper abutting surface exposed by the light incident side surface and flush with the light incident side surface.

In some embodiments, the lower abutting surface is parallel to the upper abutting surface.

In some embodiments, observed from a direction parallel to the optical axis of the lens, a first boundary that connects the middle segment to the first segment is perpendicular to a second boundary that connects the middle segment to the second segment.

In some embodiments, the second segment includes a first sub-segment and a second sub-segment. The first sub-segment extends downwardly from the middle segment and terminates at a first middle boundary. The second sub-segment extends from the first middle boundary in a direction away the middle segment. The lower surface is exposed by the light emitting side surface, and the second sub-segment is perpendicular to the first middle boundary In some embodiments, an extension length of the first sub-segment is smaller than the distance between the light incident side surface and the light emitting side surface.

In some embodiments, the base has a lateral surface connecting the light incident side surface to the light emitting side surface, and the second segment is exposed by the lateral surface.

In some embodiments, the first segment, the second segment, and the middle segment have the same thickness.

In some embodiments, the lens driving module further includes a spring sheet configured to support the lens holder. The spring sheet includes a positioning hole, and the electrical terminal includes a positioning bump that is formed corresponding to the positioning hole.

Embodiments of the disclosure provide a lens driving module having an electrical terminal, touring the mounting of the electrical terminal to a base, a positioning member is used to abut an upper and a lower abutting surface of the electrical terminal to fix the electrical terminal in place. Since the upper and the lower abutting surfaces are located at a position that is exposed to the exterior of the base, no void will be formed at the base after the removal of the positioning member. Therefore, the liquid connecting material which is used to connect the base to other elements is evenly applied on the bottom surface of the base, and the structural strength is enhanced.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

Figure 1:
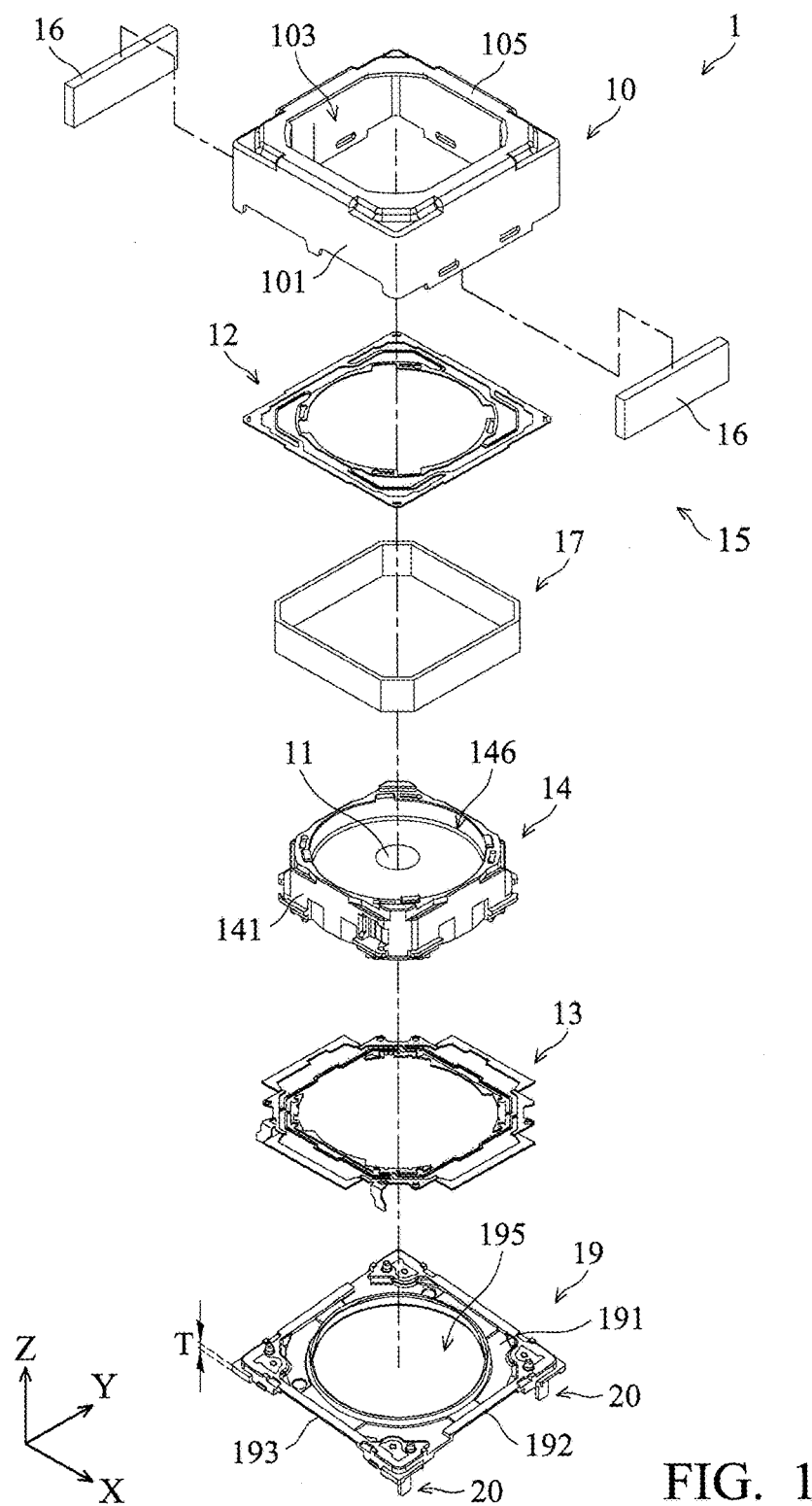
FIG. 1 shows an exploded view of a lens driving module, in accordance with some embodiments.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and " a layer is disposed over another layer" may indicate not only that the layer directly contacts the other layer, but also that the layer does not directly contact the other layer, there being one or more intermediate layers disposed between the layer and the other layer.

In this specification, relative expressions are used, For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows an exploded view of a lens driving module 1. In some embodiments, the lens driving module 1 is a voice coil motor (VCM) which includes an upper housing 10, a lens 11, a number of spring sheets, such as, upper spring sheet 12 and lower spring sheet 13, a lens holder 14, a driving assembly 15, a base 19, and two circuit terminals 20. The elements of the lens driving module 1 can be added to or omitted, and the invention should not be limited by the embodiment.

The upper housing 10 is connected to the base 19. The other elements of the lens driving module 1 are positioned in a place defined by the upper housing 10 and the base 19. In some embodiments, the upper housing 10 includes an upper sub-member 105 and one or more lateral sub-members 101 extending from edges of the upper sub-member 105 toward the base 19.

The upper spring sheet 12 and lower spring sheet 13 are configured for supporting the lens holder 14 and enabling the lens holder 14 to move in a vertical direction (Z-axis) in the upper and lower housings 10 and 19. In some embodiments, the upper spring sheet 12 is fixed at the upper housing 10, and the lower spring sheet 13 is fixed at the base 19. In some embodiments, the lower spring sheet 13 is electrically connected to the circuit terminals 20.

The lens holder 14 is configured to support the lens 11. In some embodiments, the lens holder 14 is penetrated by a passage 146. In addition, the lens holder 14 includes one or more side surfaces surrounding the passage 146. For example, as shown in FIG. 1, the lens holder 14 includes four side surfaces 141.

The driving assembly 15 is configured to drive the movement of partial elements of the lens driving module 1. In some embodiments, the driving assembly 15 is an AF driving unit for changing the focal length of the lens. The driving assembly 15 includes two magnetic elements 16 and a coil 17. The driving assembly 15 is configured to drive the movement of the lens holder 14 in a vertical direction (Z axis direction), so as to facilitate auto-focus and auto-zoom controls.

The two magnetic elements 16 are disposed on the lateral sub-members 101 of the upper housing 10. In some embodiments, the upper housing 10 is made of magnetic material, and the two magnetic elements 16 are directly attached on the inner surface of the lateral sub-members 101 that faces the lens holder 14. As a result, the process for assembling the two magnetic elements 16 is simplified.

The coil 17 is a circular structure that surrounds the outer surface of the lens holder 14. The coil 17 is configured to receive an electric current and produce a magnetic field to drive the lens holder 14 to move relative to the upper housing 10 and the base 19. In some embodiments, the coil 17 is electrically connected to the lower spring sheet 13. The electric current from the external circuit is transmitted to the coil via the terminals and the lower spring sheet 13.

It should be noted that the arrangement of the driving assembly 15 should not be limited to the above-mentioned embodiments. In some other non-illustrated embodiments, the driving assembly 15 is an OIS driving unit for improving image quality. The driving assembly 15 includes four coils (not shown in figures) and four magnetic elements (not shown in figures) arranged corresponding to the four coils. The driving assembly 15 is configured to drive the movement of the lens holder 14 in a horizontal direction, so as to facilitate an optical stabilization function.

The base 19 includes a light incident side surface 191, a light emitting side surface 192, and one or more lateral surfaces 193. For example, as shown in FIG. 1, the base 19 includes four lateral surfaces 192. The light incident side surface 191 faces the upper housing 10 and is adjacent to the lens holder 14. The light emitting side surface 192 is opposite to the light incident side surface 191. Each of the lateral surfaces 193 connects the light incident side surface 191 to the light emitting side surface 192. An opening 195 is formed at the substantial center of the base 19 and aligned with the opening 103 and the passage 146.

The two electrical terminals 20 are configured to establish an electric connection between the driving assembly 15 and the outer circuit. In some embodiments, the two electrical terminals 20 are respectively arranged in the vicinities of two corners formed between two neighboring lateral surfaces 193. A portion of each electrical terminal 20 is buried in the base 19, and the other portion of each electrical terminal 20 is exposed outside of the base 19.

Figure 2A:
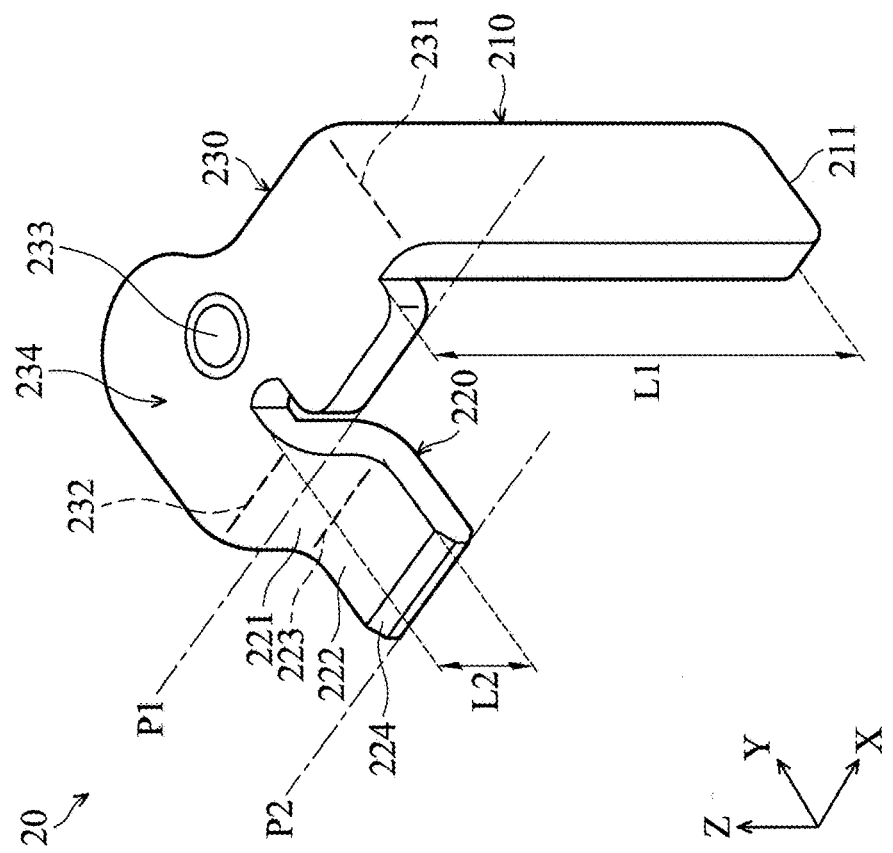
FIG. 2A shows a schematic view of a terminal, in accordance with some embodiments.
Figure 2B:
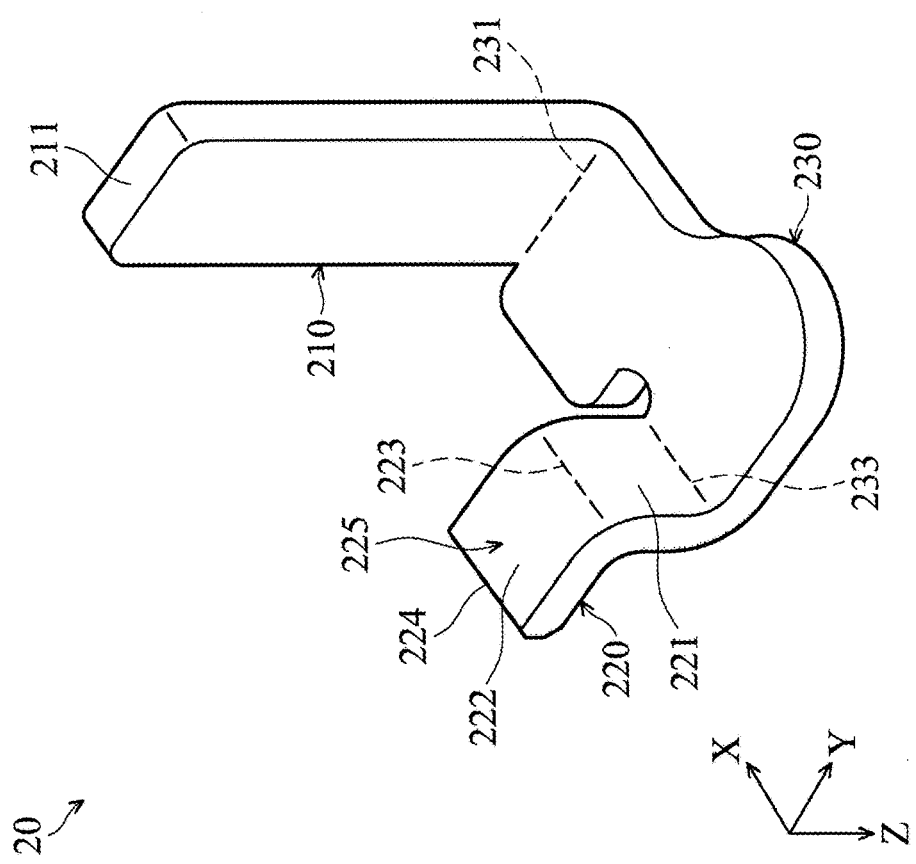
FIG. 2B shows a schematic view of a terminal, in accordance with some embodiments.

FIGS. 2A and 2B show schematic views of the electrical terminal 20, in accordance with some embodiments. For the purpose of description, the electrical terminal 20 is divided into imaginary segments: specifically a first segment 210, a second segment 220, and a middle segment 230. In some embodiments, the electrical terminal 20 is a metal plate and formed by a punching technique. As a result, the first segment 210, the second segment 220, and the middle segment 230 are formed integrally. In addition, the first segment 210, the second segment 220, and the middle segment 230 each has the same thickness.

The middle segment 230 and the first segment 210 are divided by the first boundary 231, and the middle segment 230 and the second segment 220 are divided by the second boundary 232. The middle segment 230 is extended on a first plane P1. Viewed from a vertical direction relative to the first plane P1, the first boundary 231 is substantially perpendicular to the second boundary 232. With such arrangements, the size of the lens driving module is decreased. The width of the middle segment 230 is greater than that of the first segment 210 and/or the second segment 220, and a positioning bump 233 is formed on the upper surface 234 of the middle segment 230, for facilitating the electric connection to the lower spring sheet 13. The interconnection relationship and the advantages of the positioning bump 233 and the lower spring sheet 13 are better understood with the description of the embodiments of FIG. 4.

The first segment 210 downwardly extends from the first boundary 231 and terminates at the first end 211. In some embodiments, the first segment 210 is perpendicular to the middle segment 230, and the first segment 210 has an extending length L1. The extending length L1 is greater than the thickness T (the distance between the light incident side surface 191 and the light emitting side surface 192) of the base 19 (FIG. 1). In some embodiments, the extending length L1 is determined by the conductive socket (not shown in figures) where the electrical terminal 20 is to be connected. In some embodiments, the first segment 210 has a constant width, but the disclosure should not be limited thereto. In some non-illustrated embodiments, the width of the first segment 210 may vary. For example, the width of the first end 211 of the first segment 210 gradually decreases for the ease of the connection to the connecting docking.

The second terminal 220 includes a first sub-segment 221 and a second sub-segment 222. The first sub-segment 221 and the second sub-segment 222 are divided by the middle boundary 223 In some embodiments, the first sub-segment 221 extends from the second boundary 232 and terminates at the middle boundary 223. The first sub-segment 221 is perpendicular to the middle segment 230, and the first sub-segment 221 has a extending length L2. The extending length L2 is smaller than or equal to the thickness (the distance between the light incident side surface 191 and the light emitting side surface 192) of the base 19 (FIG. 1). The difference between the extending length L2 and the base 19 (FIG. 1) is smaller than or equal to the thickness of the electrical terminal 20.

The second sub-segment 222 extends from the first sub-segment 221 in a direction away the middle segment 230 and terminates at the second end 224. In some embodiments, the second plane P2 where the second sub-segment 222 is located is parallel to the first plane P1 wherein the middle segment 230 is located. Therefore, the lower surface 225 of the second sub-segment 222 is parallel to the upper surface 234 of the middle segment 230, however the disclosure should not be limited thereto. The first plane P1 may be not parallel to the second plane P2.

In some embodiments, a method for assembling the electrical terminal 20 and the base 19 is described below.

First, two electrical terminals 20 are provided and placed into a molding (not shown in figures). In some embodiments, the two electrical terminals 20 are connected to two frames (not shown in figures) via the second ends 224. Each of the frames may include a number of electrical terminals 20. During the manufacturing process, every single electrical terminal 20 in the frame is placed into a corresponding molding.

Afterwards, the upper surface 234 of the middle segment 230 and the lower surface 225 of the second sub-segment 222 are simultaneously abutted by one or more positioning members (not shown in figures), so as to restrain the movement of the electrical terminal 20. It should be noted that, since the upper surface 234 of the middle segment 230 is parallel to the lower surface 225 of the second sub-segment 222, the electrical terminal 20 is fixed by the positioning member at a fixed place. In the following description, the upper surface 234 is referred to as "the upper abutting surface", and the lower surface 225 is referred to as "the lower abutting surface".

Afterwards, an insert molding process is performed. In the insert molding process, a liquid plastic material is applied in the molding with pressure. In some embodiments, since the upper abutting surface 234 of the electrical terminal 20, the lower abutting surface 225, and the second end 224 are fixed in a predetermined position, shaking or displacement of the electrical terminal 20 during the application of the liquid plastic material will not occur.

Afterwards, the plastic material is cured after being placed in a curing temperature for a predetermined time period. Afterwards, the positioning members for fixing the upper abutting surface 234 and the lower abutting surface 225 are removed, and the second end 224 of the electrical terminal 20 is cut to separate the electrical terminal 20 from the frame. Afterwards, the cured plastic material is removed from the molding, so as to complete the assembly of the base 19 and the electrical terminal 20.

Figure 3A:
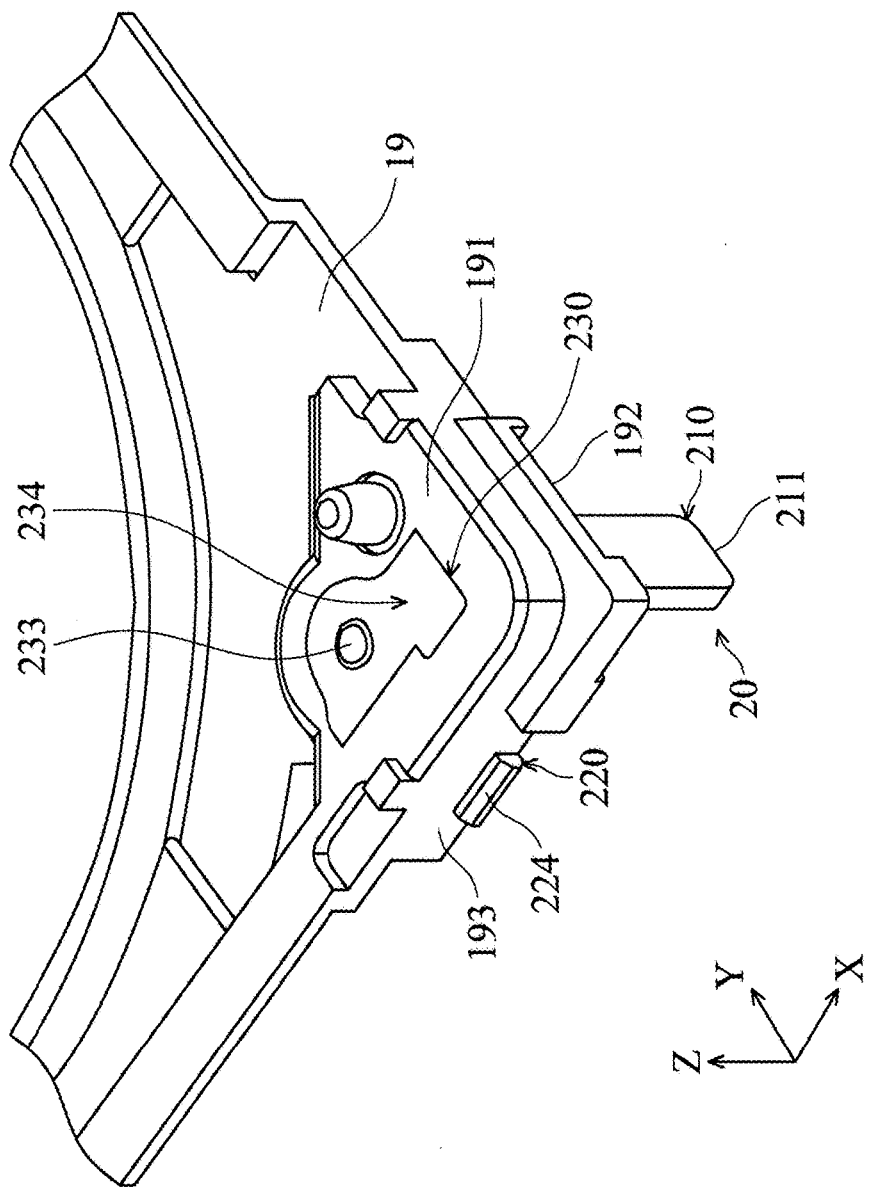
FIG. 3A shows a schematic view of a base and a terminal, in accordance with some embodiments.
Figure 3B:
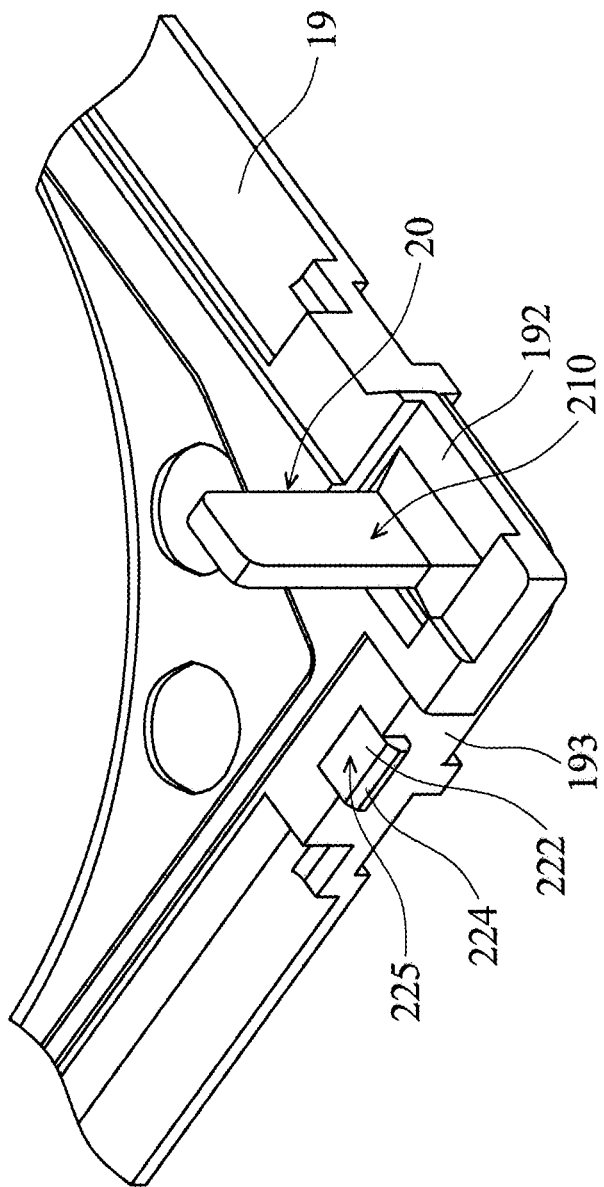
FIG. 3B shows a schematic view of a base and a terminal, in accordance with some embodiments.

FIGS. 3A and 3B show schematic views of the base 19 and the electrical terminal 20, in accordance with some embodiments. In some embodiments, after the electrical terminal 20 is fixed in the base 19, the relationship between the base 19 and the first segment 210 of the electrical terminal 20, the second terminal 220, and the middle segment 230 is described below.

As shown in FIG. 3A, the middle segment 230 of the electrical terminal 20 is disposed to be adjacent to the light incident side surface 191 of the base 19, wherein the light incident side surface 191 of the base 19 exposes the upper abutting surface 234 of the electrical terminal 20, and the upper abutting surface 234 is flushing with the immediately neighboring light incident side surface 191. A portion of the middle 230 that is below the upper abutting surface 234 is buried in the base 19 and is not exposed to the exterior. In addition, a portion of the first segment 210 that is adjacent to the middle segment 230 is buried in the base 19, and a portion of the first segment 210 that is adjacent to the first end 211 is exposed outside via the light emitting side surface 192.

The first sub-segment 221 of the second segment 220 is completely buried in the base 19. The second sub-segment 222 of the second segment 220 is exposed to the exterior via the light emitting side surface 192 of the base 19. As shown in FIG. 3B, the lower abutting surface 225 that is located on the second sub-segment 220 is exposed to the exterior, and the lower abutting surface 225 is flush with the immediate adjacent light emitting side surface 192. The portion of the second sub-segment 220 above the lower abutting surface 225 is buried in the base 19 and not exposed to the exterior. In addition, the second end 224 cut from the frame (not shown in figures) is exposed to the exterior via the lateral surface 193 of the base 19. The second end 224 may be flush with the lateral surface 193 or embossed from the lateral surface 193.

It should be noted that, since the upper abutting surface 234 and the lower abutting surface 225 of the electrical terminal 20 is exposed to the exterior of the base 19, there is no need to form extra material to cover the electrical terminal 20. As a result, the thickness of the base 19 decreases to meet the requirement of being slim.

Figure 4:
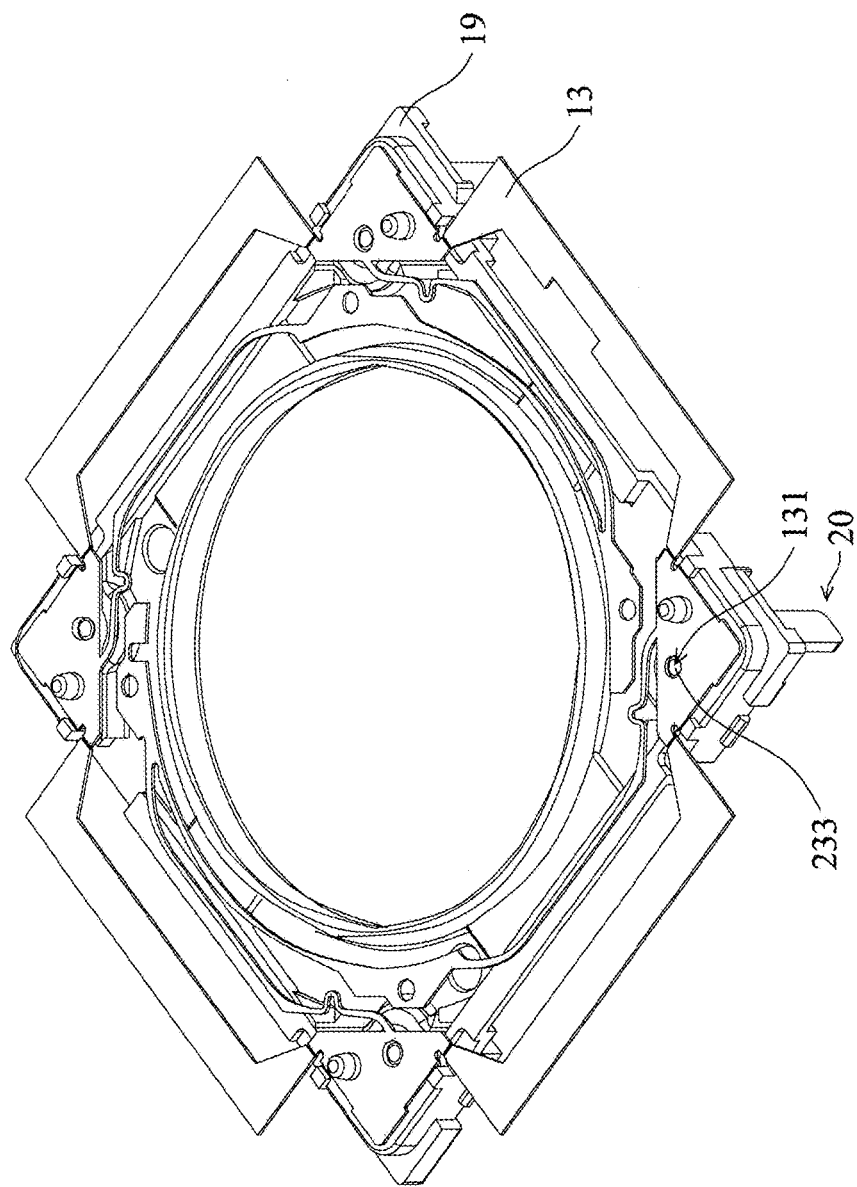
FIG. 4 shows a schematic view of a portion of a lens driving module, in accordance with some embodiments.

FIG. 4 shows a portion of elements of the lens driving module 1, in accordance with some embodiments. The lower spring sheet 13 is electrically connected to the electrical terminal 20 via the upper abutting surface 234 (FIG. 3A) of the electrical terminal 20. In some embodiments, the lower spring sheet 13 includes a positioning hole 131 that is arranged to correspond to a positioning bump 233 formed on the electrical terminal 20. Through the arrangements of the positioning bump 233 and the positioning hole 131, the lower spring sheet 13 is abutted against the upper abutting surface 234 with higher planarity so as to ensure the reliability of electric connection.

Figure 5:
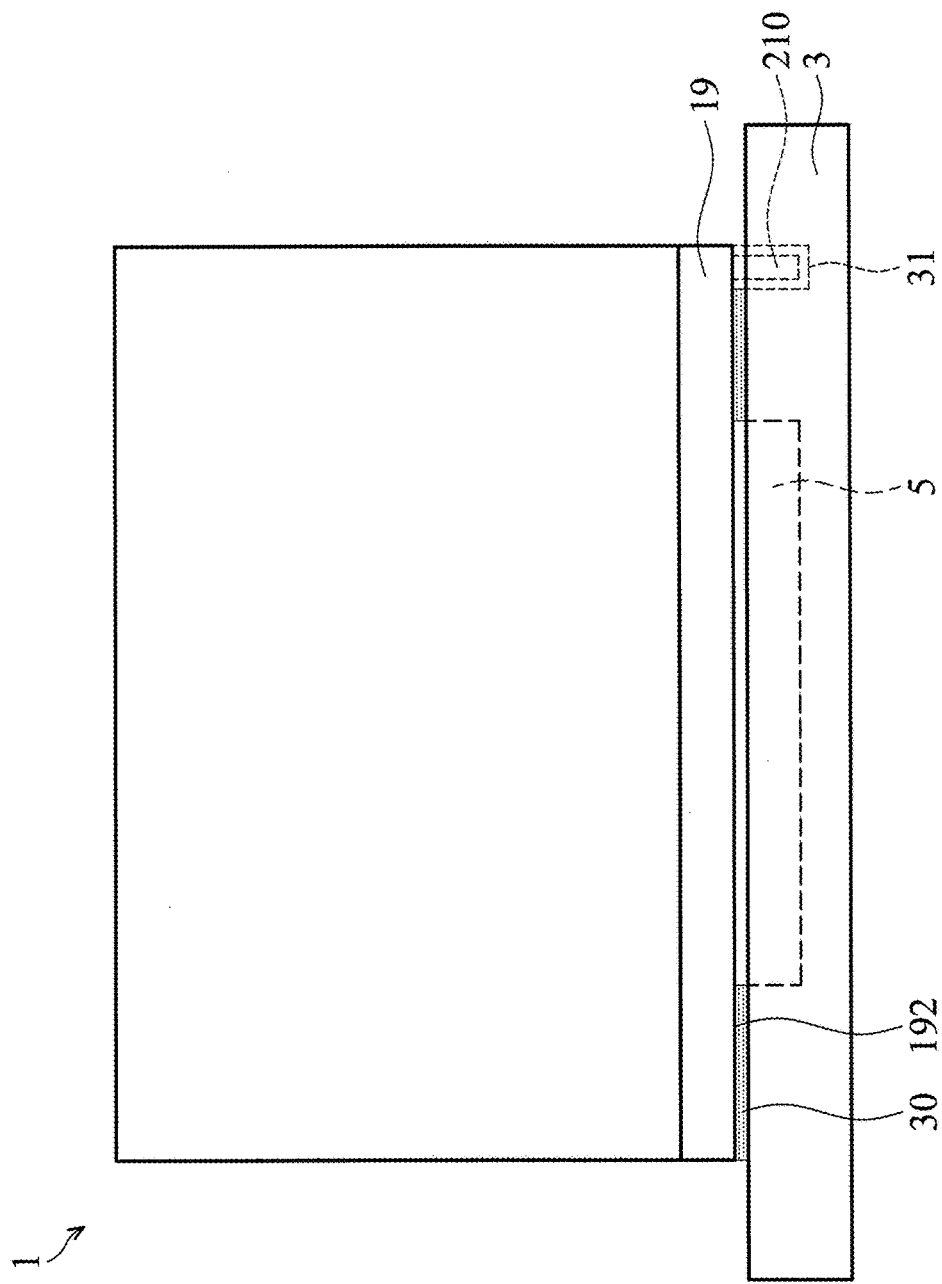
FIG. 5 shows a schematic view of a lens driving module connecting to a base, in accordance with some embodiments.

FIG. 5 shows a side view of the lens driving module connecting to a substrate 3, in accordance with some embodiments. In some embodiments, an optical detecting element 5, such as Complementary Metal-Oxide-Semiconductor (CMOS) detector, is disposed on the substrate 3. The optical detecting element 5 receives light passing through the lens driving module and produces an image signal. In addition, the substrate 3 includes two conductive sockets 31 (only one conductive socket is shown in FIG. 5), for supplying or receiving electric signals.

In some embodiments, when the lens driving module 1 is connected to the substrate 3, a liquid connecting material 30, such as glue, is applied on the light emitting side surface 192 of the base 19 of the surface of the substrate 3 of the lens driving module 1.

Afterwards, the optical axis of the lens driving module 1 is aligned with the center of the optical detecting element 5, and the first segment 210 of the electrical terminal 20 is inserted into conductive socket 31. While at the same time, the base 19 is connected to the substrate 3 via the liquid connecting material 30, and accordingly the lens driving module 1 is firmly connected to the substrate 3.

In the prior art, during the molding process, since there is no upper and lower abutting surfaces formed on the electrical terminal which allow the positioning member to abut thereon, the positioning member has to be placed into the molding to hold the electrical terminal in place. After the removal of the positioning member, a void is accordingly formed on the base. When the fluid connecting material that is used to connect the base to the substrate is applied, the fluid connecting material inevitably flows into the void. This adversely affects the base mounted on the substrate, because the base cannot be mounted on the substrate by a sufficient fluid connecting material, and the base may be separated from the substrate or be offset from a desired position as impact occurs.

On the contrary, the electrical terminal of the disclosure has an upper and a lower abutting surface for enabling the positioning member to abut thereon in the insert molding process, Since the upper abutting surface and the lower abutting surface are exposed to the exterior via the light incident side surface and the light emitting side surface, the positioning member does not have to be place in the molding. As a result, there is no void formed on the light incident side surface and the light emitting side surface, and the above-mentioned problem is addressed.

While the invention has been described by way of example and in tetras of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving module, comprising:
    a lens;
    a lens holder configured to support the lens;
    a base having a light incident side surface and a light emitting side surface;
    a driving assembly configured to drive the movement of the lens holder relative to the base;
    an electrical terminal electrically connected to an outer circuit and the driving assembly, wherein a portion of the electrical terminal is buried in the base, and the electrical terminal comprises:
        a first segment exposed by the light emitting side surface;
        a second segment exposed by the light emitting side surface;
        a middle segment connected between the first and second segment and exposed by the light incident side surface;
        a third segment embedded in the base and is not exposed from the base, wherein the third segment connects the first segment and the middle segment; and
        a fourth segment embedded in the base and is not exposed from the base, wherein the fourth segment connects the middle segment and the second segment; and
    an electrical connector electrically connected to the electrical terminal and directly connected to the middle segment.

2. The lens driving module as claimed in claim 1, wherein the second segment has a lower abutting surface exposed by the light emitting side surface and flush with the light emitting side surface.

3. The lens driving module as claimed in claim 1, wherein the middle segment has an upper abutting surface exposed by the light incident side surface and flush with the light incident side surface.

4. The lens driving module as claimed in claim 1, wherein the second segment has a lower abutting surface exposed by the light emitting side surface, and the middle segment has an upper abutting surface exposed by the light incident side surface, wherein the lower abutting surface is parallel to the upper abutting surface.

5. The lens driving module as claimed in claim 1, wherein observed from a direction parallel to the optical axis of the lens, a first boundary that connects the middle segment to the first segment is perpendicular to a second boundary that connects the middle segment to the second segment.

6. The lens driving module as claimed in claim 1, wherein the second segment comprises:
    a first sub-segment extending downwardly from the middle segment and terminates at a first middle boundary; and
    a second sub-segment, extending from the first middle boundary in a direction away the middle segment, wherein the lower surface is exposed by the light emitting side surface, and the second sub-segment is perpendicular to the first sub-segment.

7. The lens driving module as claimed in claim 6, wherein an extension length of the first sub-segment is smaller than a distance between the light incident side surface and the light emitting side surface.

8. The lens driving module as claimed in claim 1, wherein the base has a lateral surface connecting the light incident side surface to the light emitting side surface, and the second segment is exposed by the lateral surface.

9. The lens driving module as claimed in claim 1, wherein the first segment, the second segment, and the middle segment have the same thickness.

10. The lens driving module as claimed in claim 1, wherein the electrical connector is a spring sheet configured to support the lens holder, wherein the spring sheet comprises a positioning hole, wherein the electrical terminal comprises a positioning bump that is formed corresponding to the positioning hole.

11. The lens driving module as claimed in claim 1, wherein the first segment and the middle segment are respectively exposed from different surfaces of the base.

12. The lens driving module as claimed in claim 11, wherein the middle segment and the first segment are respectively exposed from different surfaces of the base.

* * * * *